May 22, 1951 R. BUCHDAHL ET AL 2,553,844
VISCOSIMETER
Filed March 21, 1947 2 Sheets-Sheet 1
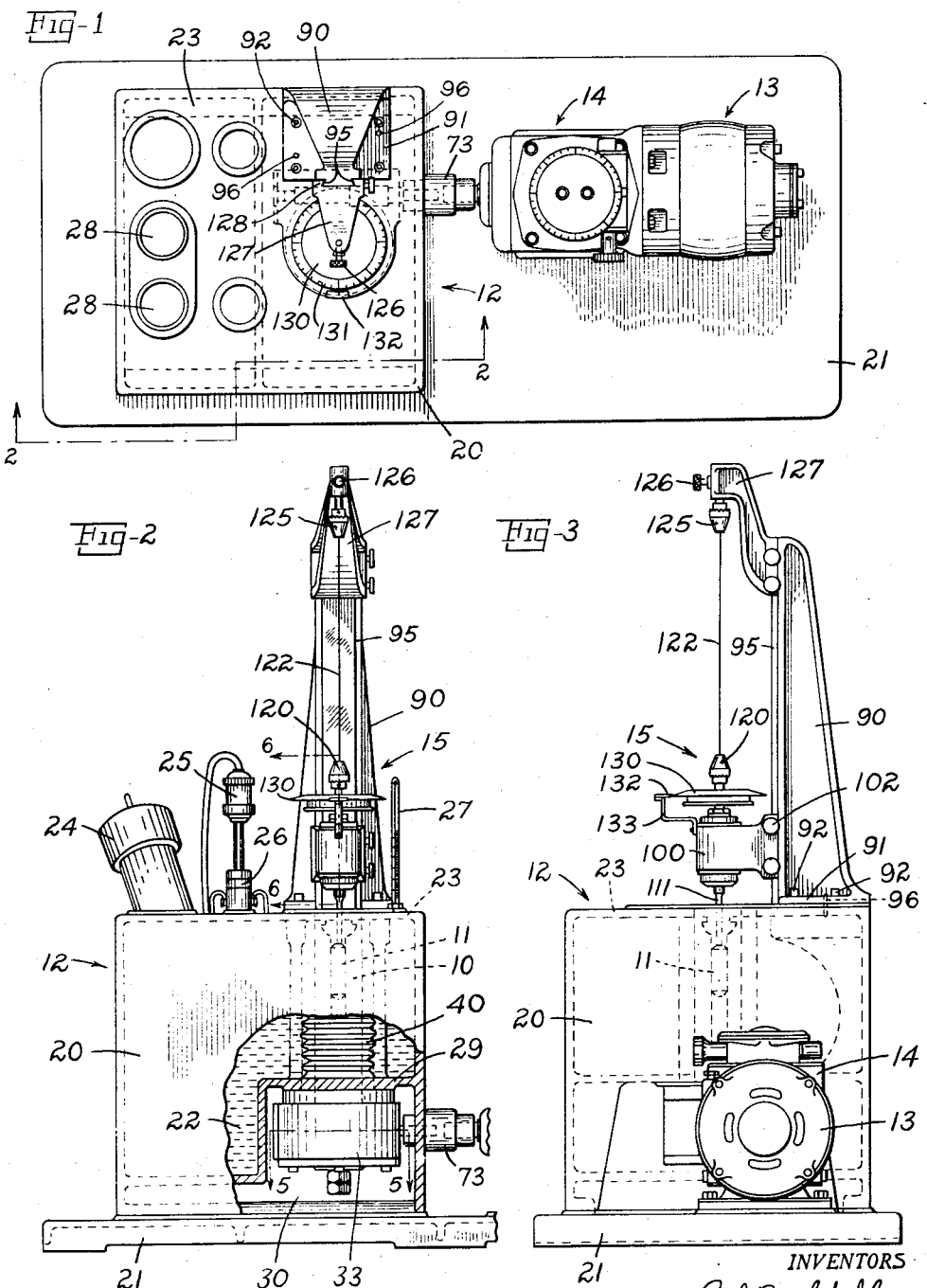
INVENTORS
Rolf Buchdahl and
BY Joseph G. Curado
Marechal & Biebel
ATTORNEYS

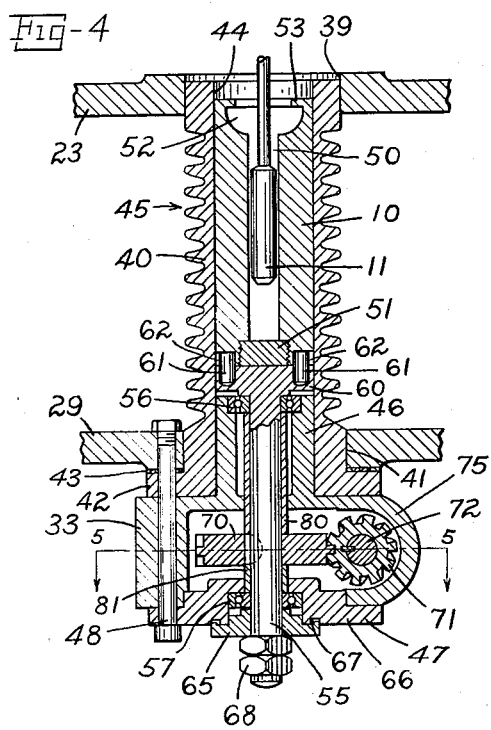
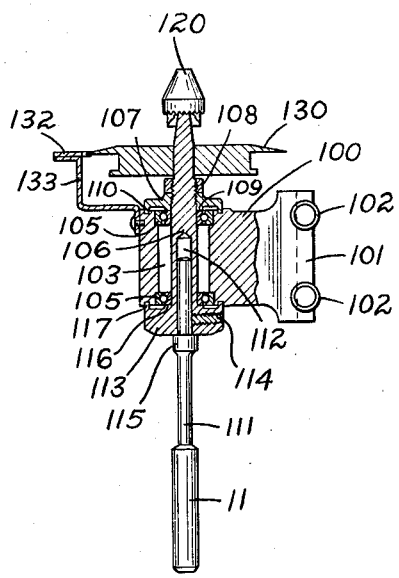
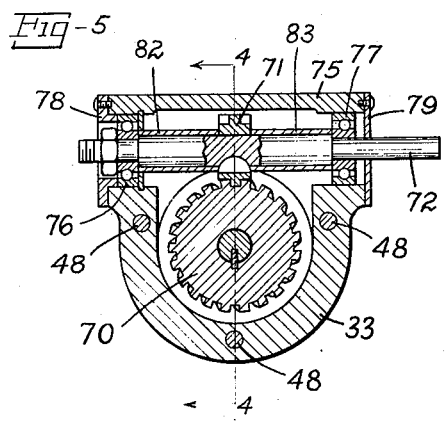
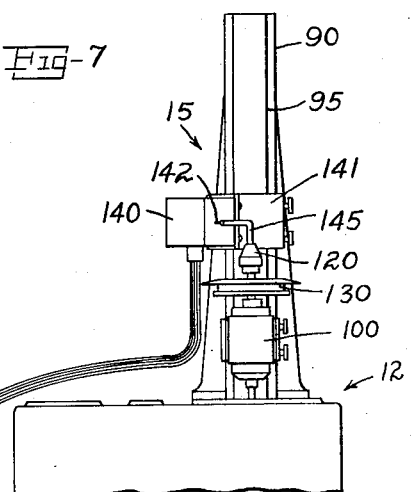

Patented May 22, 1951

2,553,844

UNITED STATES PATENT OFFICE 2,553,844

VISCOSIMETER

Rolf Buchdahl, Longmeadow, Mass., and Joseph G. Curado, Rutherford, N. J., assignors to Sun Chemical Corporation, New York, N. Y., a corporation of Delaware Application March 21, 1947, Serial No. 736,234

14 Claims. (Cl. 73—59)

This invention relates to rotational viscosimeters.

Two of the important quantities involved in rheological investigations are shearing force and rate of shear, and it is desirable in a viscosimeter designed for rheological measurement to provide for expressing the independent and dependent variables in terms of these two quantities independently of any constants in the instrument. It is also desirable that the viscosimeter be applicable to materials of a wide range of viscosities, for example a range from as low as $10^{-1}$ to as high as $10^4$ poises at room temperature, as well as being applicable to systems which are non-Newtonian (the viscosity coefficient is not constant) and exhibit time-dependent properties (thixotropy or rheopexy). This range of applicability can be obtained in a rotational viscosimeter of the Couette type, and in such an instrument, the average rate of shear (D-sec.$^{-1}$) and shearing force (F-dynes/cm.$^2$) are given by the following equations, assuming laminar flow between infinitely long cylinders:

$$D \text{ (av.)} = \frac{2.w.r_1.r_2}{(r_1)^2 - (r_2)^2} \text{ sec.}^{-2} \quad (1)$$

$$F \text{ (av.)} = \frac{M(\text{dynes}).\text{cm.}^2}{2.h.r_1.r_2} \quad (2)$$

where $w$=angular velocity of the rotating cylinder
$M$=moment acting on the stationary cylinder
$r_1$=radius of the outer cylinder
$r_2$=radius of the inner cylinder
$h$=effective length the shearing surface.

The use of these equations is not restricted to materials having a constant viscosity coefficient, and they apply equally well to non-Newtonian systems. Furthermore they remain the same irrespective of whether the inner or outer cylinder is rotating, although it should be noted that the measured shearing force is actually the force acting on the surface of the stationary cylinder. However, since this shearing force is nearly constant when $r_1/r_2$ approaches unity, it is justifiable to refer to an average rate of shear, and in view of this fact different rates of shear are most conveniently obtained by the use of a variable speed drive.

It is accordingly one of the principal objects of the present invention to provide a rotational viscosimeter capable of measuring shearing force and rate of shear in both Newtonian and non-Newtonian liquids with great precision and which is constructed to reduce to a minimum the structural and operational factors tending to affect the accuracy of these measurements.

An additional object is to provide a rotational viscosimeter of the rotating cup type constructed to maintain maximum concentricity of the rotating cup about its axis of rotation over a wide range of speeds.

It is also an object of the invention to provide a rotational viscosimeter which includes a heating bath for controlling the temperature of the material under test and wherein both cylinders and all moving parts associated therewith are shielded from contact with the liquid forming the heating bath.

Another object is to provide a rotational viscosimeter constructed to maintain proper alignment between the stationary and rotating cylinders during operation, with the maximum degree of concentricity between their respective axes and the maximum degree of parallelism between their surfaces.

Still another object is to provide a rotational viscosimeter of the rotating cup type constructed to afford maximum stability of the stationary cylinder coupled with minmum static friction.

Other objects and advantages of the invention will be apparent from the following description, the accompanying drawings and the appended claims.

In the drawings, in which like characters of reference designate like parts throughout—

Fig. 1 is a top plan view of a viscosimeter of the rotating cup type constructed in accordance with the present invention, and showing also a motor and variable drive for operating the viscosimeter;

Fig. 2 is a view in front elevation of the viscosimeter shown in Fig. 1, parts of the casing being broken away substantially on the line 2—2 of Fig. 1 to illustrate details of internal construction;

Fig. 3 is a view in side elevation of the viscosimeter shown in Fig. 1;

Fig. 4 is an enlarged view in vertical section of the stationary and rotating cylinders of the viscosimeter shown in Fig. 1 and showing also the guiding and driving mechanism for the rotating cylinder, the view being taken substantially on the line 4—4 of Fig. 5;

Fig. 5 is a view in horizontal section of the driving mechanism shown in Fig. 4, the view being taken substantially on the line 5—5 of Fig. 2 and also of Fig. 4;

Fig. 6 is a view in vertical section of the stationary cylinder and the guiding and supporting mechanism therefor, the view being taken substantially on the line 6—6 of Fig. 2; and Fig. 7 is a partial view in front elevation illustrating the use of a strain gauge and galvanometer for measuring deflection of the stationary cylinder of the viscosimeter shown in Fig. 1.

The drawings illustrate a preferred embodiment of the invention and show a rotational viscosimeter having an outer cylinder 10 which contains the material under test and an inner cylinder or bob 11. The outer cylinder 10 is mounted in a frame indicated generally at 12, which contains a heating bath, and is caused to rotate relative to the frame by means of a motor 13 and variable speed transmission 14. The bob 11 is connected with a shaft which is supported by the frame for free rotational movement in response to torque applied to the bob by the material under test when the outer cylinder is rotated, and means indicated generally at 15 are provided for measuring such rotational movement of the shaft in order to determine the amount of torque thus applied to the bob. In Figs. 1–3 the measuring means 15 are shown as including a torsion wire and a dial for measuring angular movement of the bob shaft, and in Fig. 7 the measuring means are shown as including an electrical strain gauge for measuring this torque and a galvanometer for indicating the output current of the strain gauge.

Referring to Figs. 1–5, the frame 12 is shown as including a generally rectangular casing 20 mounted on a base 21 which serves also as a base for the motor 13 and variable speed transmission 14. This casing 20 encloses a heating bath 22 for the purpose of controlling the temperature of the material whose viscosity is under test, and as shown in Fig. 1, the top wall 23 of casing 20 is provided with a plurality of openings to receive various members for the control of the temperature of the heating bath 22, such members being illustrated in Fig. 2 as including an agitator 24, a heater 25, a thermostatic control 26 for the heater and a thermometer 27. The two openings indicated at 28 may be used to receive cups containing material to be tested, so that this material may be brought to temperature before the cup is placed in the shell 40 for rotation and measurement. The bottom wall 29 of the casing 20 is raised at one side, as shown in Fig. 2, to form a chamber 30 which receives the housing 33 enclosing the gear transmission by which the power from motor 13 and variable speed transmission 14 is transmitted to the rotating cylinder 10.

Now referring more particularly to Figs. 4 and 5, a hollow shell 40 is mounted within casing 20 with its upper end seated in a suitable receiving opening 39 in the upper casing wall 23 and its lower end similarly extending through an opening 41 in the bottom casing wall 29. This lower end of the shell 40 includes an outwardly projecting flange or shoulder 42 which seats against the lower surface of the bottom casing wall 29, a gasket 43 being included between the shoulder and casing to prevent leakage. The two openings 39 and 41 in these casing walls which receive the sleeve 40 are in accurate coaxial alignment so that the sleeve is thus held fixed with relation to the upper surface of the casing and with its inner cylindrical bore 44 accurately at right angles to the upper surface of the casing. The outer surface of the sleeve 40 is corrugated or ribbed as indicated at 45 to provide for maximum heat interchange between the bath 22 and the interior of the bore 44. As shown in Fig. 4, the housing 33 includes a cylindrical portion 46 which extends up into the bore 44 and a cover plate 47, and these parts are all held together and secured to the bottom casing wall 29 by bolts 48 which extend through the shoulder 42 on shell 40.

The cylinder 10 may be formed of stainless steel and is preferably of sufficient length, for example 4¼", to provide the desired long internal bore 50 for cooperation with the cylindrical bob 11. A suitable diameter for this bore 50 is 0.472", and the thickness of the cylinder should be sufficient to insure adequate stability of rotation, a wall thickness of ½" having been found satisfactory. The lower end of the bore 50 may be provided, as shown, with a removable plug 51 to facilitate cleaning after use. The upper end of the bore is enlarged at 52, and a flange 53 extends partially over this enlarged portion, this construction serving to restrain the material in the cup against being thrown out during rotation.

Both the inner and outer surfaces of the cylinder 10 are ground to a high degree of smoothness, for example to a tolerance of −0.0005 inch, +.0000 inch. The surface of the bore 44 in shell 40 is similarly machined to a high degree of smoothness, and the diameter of this bore and the outer diameter of the cylinder 10 are such that the cylinder 10 will have a close but substantially frictionless fit within the shell. In this way, the shell serves to support and position the cylinder 10 in accurate perpendicular alignment relative to the top of the casing, and it also provides a bearing in which the cylinder 10 can rotate freely with minimum danger of loss of the desired alignment. The shell 40 also shields cylinder 10 from contact with the heating bath 22, thus preventing any drag which could result from rotation of the cylinder 10 while in contact with the heating bath, but at the same time the corrugated structure of the shell provides for maximum heat interchange between the heating bath and the material under test in cylinder 10.

In order to rotate cylinder 10 in the shell 40, a shaft 55 is mounted in housing 33 and supported by ball bearings 56 in the housing extension 46 and ball bearings 57 set in the housing cover plate 47. The upper end of shaft 55 includes a shoulder 60 which is free to rotate within the bore 44 and in which are set two pins 61 which are received in cooperating slots 62 in the bottom of cylinder 10, thus providing a keyed connection between the shaft and cylinder 10. At its lower end, shaft 55 is provided with a ring member 65 which serves to enclose bearings 57 and which includes a flange 66 fitting within a corresponding annular groove 67 in the outer surface of the cover plate 47. Lock nuts 68 on the lower end of shaft 55 serve to hold this ring 65 in place and thus provide a dust-free chamber for bearings 57.

A spiral gear 70 is keyed or otherwise secured to shaft 55 and meshes with a spiral pinion 71 keyed to a shaft 72, which is connected, as by means of the clutch 73 (Fig. 1) with the drive shaft from the variable speed transmission 14. This spiral gear arrangement provides a drive having a minimum of thrust, or change in position due to thrust, such as is normallyy encountered where thrust bearings are used, and in addition it provides a substantially surgeless operation. The housing 33 is provided with a semi-cylindrical portion 75 to receive the gear 71, and bearings 76 and 77 are provided at opposite ends of this housing portion 75 to support the shaft 72. Annular cover plates 78 and 79 may be provided at either end of the housing portion 75 as shown in Fig. 5, and both of shafts 55 and 72 may also be provided with spacing bushings 80, 81, 82 and 83 positioned between and locating precisely the gears thereon and the bearings which support these shafts. It will be seen that this construction of the drive mechanism, as shown in Fig. 4, provides for complete isolation from the heating bath 22 of all the drive mechanism used to rotate cylinder 10, thus making it unnecessary to employ stuffing boxes or the like to protect the bearing or gear arrangements in operation.

Referring to Figs. 1-3, the supporting structure for the bob 11 includes a stand 90 having shoulders 91 at each side by which it is rigidly secured to the upper surface of casing 20 by means of bolts 92, and the lower surface of this stand and the upper surface of the casing which supports it are preferably machined to insure a high degree of accurate parallelism. The front of this stand 90 has formed thereon a dove-tailed track 95 for the brackets which support the bob, and if this track and the bottom surface of the stand are accurately machined to a right-angled relation, the track can be readily positioned in accurate parallel relation with the axis of the shell 40 and rotating cylinder 10. When the stand has been properly located in the desired lateral position relative to the shell 40, it may be finally located in position by means such as tapered pins 96 driven through the shoulder 91 into the upper wall of the casing.

Referring to Fig. 6, a bracket or arm 100 for supporting the bob is formed with shoulders 101 accurately fitting the track 95 and provided with thumb screws 102 for locking in vertical position on the track and support 90. This bracket 100 has a vertical bore 103 therein, at each end of which is mounted a non-rotational ball bearing 105. A shaft 106 is supported in these bearings 105 and has a ring 107 and lock nut 108 threaded thereon adjacent the upper bearing 105. The ring 107 includes two annular shoulders in its lower surface, one shoulder 109 being adapted to engage the inner race of the upper bearing 105 and the other shoulder 110 fitting within a complementary groove in the upper surface of the bracket 100 and thus providing a substantially dust-tight enclosure for the upper end of the bore 103.

The bob 11 may be formed of stainless steel and is connected at one end with a supporting shaft or spindle 111, a convenient construction being to form the bob integrally with the spindle. The length of the bob 11 should be sufficient, for example 1.75" for use with a cylinder 10 which is 4.25" in length, and this diameter of bob 11 should be such as to provide a ratio of spindle length to clearance between bob 11 and cup 10 of about 100:1, to provide for approaching the theoretical condition of infinitely long cylinders. Several bobs of different sizes may be provided to permit tests on different thicknesses of material. The outer surface of the bob is machined to a high degree of smoothness, for example to a tolerance of +0.0005"–0.0000", and its ends are shown as made conical to minimize any end effects in use.

Ready attachment between the shaft or spindle 111 and the upper shaft 106 is provided by inserting the upper end of the shaft 111 within an axial bore 112 in the lower end of the shaft 106. This lower end of shaft 106 is also formed with a collar 113 which receives a set screw 114 for locking shaft 111 to shaft 106, the shaft 111 being formed with a shoulder 115 adapted to abut the collar 113 to limit insertion of the upper end of shaft 111 in the bore 112. The upper surface of collar 113 is formed with shoulders 116 and 117 similar to the shoulders 109 and 110 on ring 107 and similarly engaging, respectively, the inner race of the lower non-rotational ball bearing 105 and a receiving groove in the lower surface of the bracket 100. This collar 113 thus cooperates with the ring 107 to enclose bore 103 completely and to provide a dust-tight enclosure for bearings 105. At the same time, this construction also provides for ready removal of bob 111 for cleaning or replacement, for example with a bob of a different diameter, without disturbing the dust-tight enclosure for the bearings or the alignment of the shaft 106 relative to shell 40.

It will accordingly be seen that the above construction provides for obtaining and maintaining highly accurate vertical alignment of the outer cylinder 10 relative to the top of the casing and similarly of the inner cylinder or bob 11 relative to the top of the casing. In order to obtain proper concentricity between the two cylinders, it has been found useful in the initial assembly of the instrument to employ a special bob of diameter substantially equal to the outer diameter of the cylinder 10, and to carry out the aligning operation with this cylinder 10 removed from shell 40. That is to say, this oversized bob is inserted within shell 40 before bolts 92 are finally tightened, thus accurately locating the stand 90 relative to the axes of the two cylinders. Then with the stand 90 thus located in position, the tapered pins 96 are driven into place, thereby finally fixing the stand in the desired position. The oversized bob can then be readily removed by raising the bracket 100 on the dove-tailed track 95, and this same procedure is followed for removal and replacement of the working bobs.

The use of non-rotational bearings 105 for supporting the bob spindle is of considerable importance in the use of the viscosimeter, particularly at low speeds and for measuring liquids of low viscosity. These are ring ball bearings in which the balls, instead of being spaced apart by the customary retainer rings, are separated from each other by coil springs of fine wire. These bearings, due to the very construction thereof, are not suitable for use where any appreciable degree of rotational speed is had and thus, for the purposes of the present invention are termed "non-rotational bearings." Such bearings, a satisfactory example being the New Departure No. SR6x1378U1, have extremely low inertia and thus provide for ready movement of the bob in response to the force imposed upon rotation of the cylinder 10 with a liquid material contained therein. With this type of bearing, this viscosimeter provides satisfactory measurement of materials of low viscosity, and additionally the bob is sensitive to force imparted to it at low rotational speeds of the cup, thus avoiding interference with the desired sensitivity of the instrument from the use of bearings of the usual rotational type.

In the use of this instrument, the material whose viscosity is to be determined is placed within the cylinder or cup 10, and the bob 11 is inserted in the cylinder 10, the amount of material being used being sufficient to cover the bob completely. Then the cylinder 10 is rotated by means of the motor 13 and variable speed transmission 14, and the torque exerted on the bob by the material under test during rotation is measured by suitable torsion-sensitive means connected with the bob shaft. As shown in Fig. 6, a chuck 120 is secured to the upper end of the upper bob shaft 106 to provide for readily securing a torsion-sensitive member to the shaft. Figs. 1–3 show the use of the instrument employing a torsion wire and dial for measuring angular movement of the bob shaft. As shown in Figs. 2 and 3, the lower ends of this torsion wire 122 is gripped in the chuck 120 and its upper end is gripped in a similar chuck 125 mounted by means of a lock screw 126 in a bracket 127 which is in turn mounted on stand 90, the bracket 127 having shoulders 128 fitting the dove-tailed track 95 on stand 90. A disk or dial 130 is keyed or otherwise secured to shaft 106, and is provided along its rim with suitable indicia 131 for indicating angular movement of the shaft. A pointer 132 is mounted by means of an arm 133 on bracket 100 and provides a zero or index position and vernier scale for cooperation with the scale 131 on dial 130.

In the use of the instrument with this torsion wire and associated elements, the cylinder 10 containing the material under test is caused to rotate at a measured rate, and the angular movement of the bob for a given time is measured by observation of the motion of dial 130 with respect to the pointer 132. The value for $w$ thus obtained can then be substituted in Equation 1 above to give the average rate of shear. The same measurements may be repeated for different speeds of rotation of the cylinder 10 and/or different temperatures of the material under test in order to provide adequate data for a complete chart of viscosity characteristics. The shearing force may be similarly computed from Equation 2 above in accordance with the speed of rotation of the cylinder 10 and the known calibrated resistance to deflection of the bob shaft exerted by the torsion wire 122.

Fig. 7 illustrates the use of the instrument of the invention employing an electrical strain gauge for measurement of the deflection of the bob shaft. As shown in Fig. 7, a strain gauge 140 may be mounted adjacent the chuck 120 by means of a suitable bracket 141 secured to the track 95 on stand 90. Such strain gauges are of known construction and comprise essentially an armature suspended in a number of prestressed constantan filaments and having a link extending outside of the instrument housing to provide a feeler 142. The constantan filaments are so constructed that they form the four arms of a Wheatstone bridge, and in the gauge are four electrical terminals for the four corners of the bridge, two of these terminals being connected to a power supply, and the other two terminals being connected directly to a suitable indicating instrument such as the galvanometer illustrated at 144 in Fig. 7.

In the use of the strain gauge with the instrument of the invention, movement of the bob shaft may be measured by the strain gauge and galvanometer as a result of stress on the feeler 142, and an L-shaped arm or lever 145 is accordingly mounted in chuck 120 in position to engage this feeler when the bob shaft rotates. With this arrangement, the power input to the Wheatstone bridge may be so adjusted that with the instrument at rest there will be no deflection of the galvanometer, the wires of the Wheatstone bridge thus being in equilibrium. When the cylinder 10 is caused to rotate, it will produce rotation of the bob through the material under test, the amount of rotation being determined by the flow properties of the materials in the cylinder 10. The arm 145 will accordingly be caused to press against the feeler 142 and thus impart stress to the constantan filaments, and the amount of such stress will be recorded on the galvanometer. It will be understood that the galvanometer or other recording or indicating means may be readily calibrated, for example by liquids of known viscosity, to read in poises, thus providing for direct reading in poises on the instrument 144 of the flow properties of the material under test.

The use of a strain gauge as described has a highly advantageous result in that it provides for securing a continuous record of the rotational movement of the bob with time. This is of considerable importance where the time-dependent characteristics of a particular liquid are to be determined. For such uses, it is desirable to utilize with the strain gauge an indicating instrument capable of providing a written record of such change of flow properties with time, for example an amplifying and recording circuit such as that provided by the recording unit sold under the trade name "Speedomax," a product of Leeds and Northrup, Philadelphia, Pa.

The present invention accordingly provides a viscosimeter which is capable of use in measuring shearing force and rate of shear in both Newtonian and non-Newtonian liquids, and which will give highly accurate results very readily and over a wide range of temperatures and viscosities. It will be noted particularly that the invention reduces to a minimum the structural and operational factors tending to affect the accuracy of the measurements. The construction of the heating bath in the casing and the provision of shell 40 afford accurate control over the temperature of the material under test while at the same time preventing drag on the rotating parts of the instrument by the liquid of the bath. This shell also is a material factor in maintaining accurate alignment of the rotating parts and particularly of the rotating cylinder, the inner surface of the shell affording an extended bearing surface for supporting the rotating cylinder with maximum concentricity relative to its own axis.

The construction of the invention also affords maximum stability of the stationary cylinder or bob and maximum support against deflection relative to its axis, coupled with minimum static friction such as could tend to affect the accuracy of the measurements. The supporting structure for the bob also provides for highly accurate concentric alignment of the two cylinders while at the same time readily permitting removal of the bob or the rotating cylinder for cleaning or replacement without danger of loss of proper alignment. It should also be noted that the instrument of the invention is formed of component parts of such character that they are readily made to the tolerances required for maximum accuracy, these parts being individually of comparatively simple shape and hence permitting machining to the required accuracy by conventional manufacturing techniques.

While the forms of apparatus herein described constitute preferred embodiments of the invention, it is to be understood that the invention is not limited to these precise forms of apparatus, and that changes may be made therein without departing from the scope of the invention which is defined in the appended claims.

We claim:

1. In a viscosimeter of the character described including a casing adapted to contain a heating bath, the combination of a cylinder for containing material under test, a shell adapted to receive said cylinder therein in rotatable concentric relation, the outer surface of said cylinder and the inner surface of said shell being substantially in contact and said shell providing a bearing for said cylinder, means mounting said shell in said casing and in contact with said bath, said shell being constructed and arranged to shield said cylinder from contact with said bath while freely transmitting heat from said bath to said cylinder, and means for rotating said cylinder relative to said shell.

2. In a viscosimeter of the characted described including a casing adapted to contain a heating bath, a shell positioned within said casing with its outer surface in contact with said bath, a cylinder adapted to contain material under test, said shell having a cylindrical bore adapted to receive said cylinder therein with the outer surface of said cylinder substantially in contact with the surface of said bore but rotatable relative thereto, means securing said shell to said casing and sealing said bore and said cylinder from contact with said bath, the wall of said shell surrounding said bore and being corrugated to transmit heat freely from said bath to said bore and cylinder therein, and means for rotating said cylinder relative to said shell and including a driving connection to said cylinder extending axially through a portion of said shell, said bore providing a bearing maintaining accurate alignment of said cylinder relative to the rotational axis thereof.

3. In a viscosimeter of the character described including a casing adapted to contain a heating bath, a shell positioned within said casing with its outer surface in contact with said bath, a cylinder adapted to contain material under test, said shell having a cylindrical bore adapted to receive said cylinder therein with the outer surface of said cylinder substantially in contact with the surface of said bore but rotatable relative thereto, a lower portion of said shell extending through said casing to a position outside said bath, means securing said shell to said casing and substantially sealing the interior of said bore from said bath, said shell being constructed to transmit heat freely from said bath to said bore and cylinder therein, power transmitting means secured outside said bath, and means extending axially through a portion of said shell and providing a driving connection from said power transmitting means to said cylinder to rotate said cylinder relative to said shell, said bore providing a bearing maintaining accurate alignment of said cylinder relative to the rotational axis thereof.

4. In a viscosimeter of the character described including a casing adapted to contain a heating bath, a shell positioned within said casing with its outer surface in contact with said bath, a cylinder adapted to contain material under test, said shell having an axial bore extending completely therethrough and adapted to receive said cylinder therein with the outer surface of said cylinder substantially in contact with the surface of said bore but freely rotatable relative thereto, the lower end of said shell extending through said casing to a position outside said bath, means securing said shell to said casing and substantially sealing the interior of said bore from said bath, said shell being constructed to transmit heat freely from said bath to said bore and cylinder therein, a housing connected with said lower end of said shell, a power transmission within said housing adapted to be driven from a source of power outside said casing, means including a shaft arranged axially of said shell and sealed thereby from said bath for providing a driving connection from said power transmission to said cylinder to rotate said cylinder relative to said shell, bearing means in said housing supporting said shaft for rotation therein, and means cooperating with said housing to provide a substantially dust-free enclosure for said bearing means.

5. In a viscosimeter of the character described including a casing adapted to contain a heating bath, a shell positioned within said casing with its outer surface in contact with said bath, a cylinder adapted to contain material under test, said shell having an axial bore extending completely therethrough and adapted to receive said cylinder therein with the outer surface of said cylinder substantially in contact with the surface of said bore but freely rotatable relative thereto, the lower end of said shell extending through said casing to a position outside said bath, means securing said shell to said casing and substantially sealing the interior of said bore from said bath, said shell being constructed to transmit heat freely from said bath to said bore and cylinder therein, a housing connected with said lower end of said shell, a power transmission within said housing adapted to be driven from a source of power outside said casing, a shaft arranged axially of said shell and sealed thereby from said bath, bearing means supporting said shaft for rotation in said housing, means providing a driving connection between said shaft and said power transmission, a shoulder connected with the upper end of said shaft and of such size as to rotate freely within said bore, and means providing a keyed connection between said shoulder and the lower end of said cylinder for rotating said cylinder with said shaft, said bore providing a bearing maintaining accurate alignment of said cylinder relative to the rotational axis thereof.

6. In a viscosimeter of the character described including a casing adapted to contain a heating bath, a shell positioned within said casing with its outer surface in contact with said bath, a cylinder adapted to contain material under test, said shell having an axial bore extending completely therethrough and adapted to receive said cylinder therein with the outer surface of said cylinder substantially in contact with the surface of said bore but freely rotatable relative thereto, the lower end of said shell extending through said casing to a position outside said bath, means securing said shell to said casing and substantially sealing the interior of said bore from said bath, said shell being constructed to transmit heat freely from said bath to said bore and cylinder therein, a housing connected with said lower end of said shell, a plurality of axially spaced bearings positioned within said housing, a shaft supported for rotation in said bearings and extending into said shell bore, means providing a driving connection between said shaft and said cylinder to rotate said cylinder with said shaft relative to said shell, said shell shielding said shaft and connection from contact with said bath, and means cooperating with said housing to provide a substantially dust-free enclosure for said bearings.

7. In a rotational viscosimeter including a frame and having inner and outer cylinders adapted to be supported by said frame for relative concentric rotation, said outer cylinder being adapted to contain material under test, the combination of a shell having an internal bore adapted to receive said outer cylinder in rotatable relation and to serve as a bearing for said outer cylinder, means rigidly connecting said shell to said frame to maintain alignment of said outer cylinder relative to the rotational axis thereof, a supporting member for said inner cylinder, means rigidly securing said supporting member relative to said frame, an enclosure mounted on said supporting member, bearings within said enclosure, a shaft supported for rotation in said bearings, means cooperating with said shaft and said enclosure to provide a substantially dust-free chamber for said bearings in said enclosure, and means providing a supporting connection from said shaft to said inner cylinder externally of said dust-free chamber.

8. In a rotational viscosimeter including a frame and having inner and outer cylinders adapted to be supported by said frame for relative concentric rotation, said outer cylinder being adapted to contain material under test, the combination of an upright supporting member for said inner cylinder rigidly connected with said frame, an arm mounted on said supporting member and having a vertical bore therethrough, a plurality of axially spaced bearings positioned in said bore, a shaft supported for rotation in said bearings, means on said shaft cooperating with said arm to close the ends of said bore and thereby to provide a substantially dust-free chamber for said bearings, means connecting said shaft to said inner cylinder, a shell having an internal bore adapted to receive said outer cylinder in rotational relationship and to serve as a bearing for said outer cylinder, and means rigidly connecting said shell to said frame to maintain alignment of said outer cylinder to the rotational axis thereof and to maintain accurate axial alignment of said outer cylinder with said inner cylinder and shaft.

9. In a rotational viscosimeter including a frame and having inner and outer cylinders adapted to be supported by said frame for relative concentric rotation, said outer cylinder being adapted to contain material under test, the combination of a shell having an internal bore adapted to receive said outer cylinder in rotatable relationship and to serve as a bearing for said outer cylinder, means rigidly connecting said shell to said frame to maintain alignment of said outer cylinder relative to the rotational axis thereof, an upright supporting member for said inner cylinder rigidly connected with said frame, an arm mounted on said supporting member and having a vertical bore therethrough, a plurality of axially spaced bearings positioned in said bore, a two-piece shaft for supporting said inner cylinder, the lower part of said shaft being connected with said inner cylinder, the upper part of said shaft being supported for rotation in said bearings, means on said upper shaft cooperating with said arm to close the ends of said bore and thereby to provide a substantially dust-free chamber for said bearings, means providing a telescoping driving connection between said shaft parts, and a chuck connected to the upper end of said upper shaft part and adapted to provide an operative connection to a torsion-sensitive member.

10. In a rotational viscosimeter including a frame and having inner and outer cylinders adapted to be supported by said frame for relative concentric rotation, said outer cylinder being adapted to obtain material under test, the combination of a shell having an internal bore adapted to receive said outer cylinder in rotatable relation and to serve as a bearing for said outer cylinder, means rigidly connecting said shell to said frame to maintain alignment of said outer cylinder relative to the rotational axis thereof, an upright supporting member for said inner cylinder rigidly connected with said frame, said supporting member having a dove-tailed track thereon, an arm mounted for sliding movement on said supoprting member and having means cooperating with said dove-tailed track to maintain relative alignment of said arm and supporting member, said arm having a bore therethrough substantially parallel to said track, a plurality of axially spaced bearings positioned in said bore, a shaft supported for rotation in said bearings, means cooperating with said arm to close the ends of said bore and thereby to provide a substantially dust-free chamber for said bearings, means for connecting a torsion-sensitive member to the upper end of said shaft, a lower shaft integrally formed with said inner cylinder, the lower end of said upper shaft having an axial bore adapted to receive the upper end of said lower shaft, and means for releasably securing said shafts together in driving connection, said slidable mounting of said arm on said supporting member providing for ready withdrawal of said inner cylinder from said outer cylinder and said connection between said shafts providing for ready removal and replacement of said inner cylinder while maintaining alignment of said upper shaft relative to said outer cylinder.

11. In a viscosimeter of the character described including a casing adapted to contain a heating bath, a shell positioned within said casing with its outer surface in contact with said bath, said shell having a cylindrical bore therein, means connecting said shell to said casing with the axis of said bore in accurate vertical alignment relative to the top of said casing, means sealing said bore from said bath, a cylindrical bob, a support for said bob, a shaft connected to said bob and journaled in said support, means securing said support to the top of said casing with said bob and shaft in accurate concentric alignment with said bore in said shell, and a cylinder adapted to contain material under test, the inner diameter of said cylinder being in predetermined excess of the diameter of said bob, the outer diameter of said cylinder being such that said cylinder will be received in said shell bore in close rotatable relation with said shell serving as a bearing for said cylinder and maintaining said cylinder in accurate concentric alignment with said bob, said shell being constructed to transmit heat freely from said bath to said cylinder while shielding said cylinder from contact with said bath.

12. In a viscosimeter of the character described including a casing adapted to contain a heating bath, a shell positioned within said casing with its outer surface in contact with said bath, said shell having a cylindrical bore extending completely therethrough, means connecting said shell to said casing with the axis of said bore in accurate vertical alignment relative to the top of said casing, means sealing said bore from said bath, a cylindrical bob, a support for said bob, a shaft connected to said bob and journaled in said support, means securing said support to said casing with said bob and shaft in accurate concentric alignment with said bore in said shell, means for connecting a torsion-sensitive member to said shaft, a cylinder adapted to maintain material under test and having its inner diameter in predetermined excess of the diameter of said bob, the outer diameter of said cylinder being such that said cylinder will be received in said shell bore in close rotatable relation with said shell serving as a bearing for said cylinder and maintaining said cylinder in accurate concentric alignment with said bob, means providing a driving connection to said cylinder and including a shaft extending axially through the lower end of said shell, and means connected with said shell for supporting said shaft in accurate concentric alignment with said shell bore, the outer surface of said shell being corrugated to transmit heat freely from said bath to cylinder while shielding said bore and cylinder and said driving shaft from contact with said bath.

13. In a viscosimeter of the character described including a casing adapted to contain a heating bath, a shell positioned within said casing with its outer surface in contact with said bath, a cylinder adapted to contain material under test, said shell having a cylindrical bore adapted to receive said cylinder therein with the outer surface of said cylinder substantially in contact with the surface of said bore but rotatable relative thereto, a lower portion of said shell extending through said casing to a position outside said bath, means securing said shell to said casing and substantially sealing the interior of said bore from said bath, said shell being constructed to transmit heat freely from said bath to said bore and cylinder therein, a shaft extending axially through the lower portion of said shell for driving said cylinder, and power transmitting means secured in fixed relation to said shell outside said bath and including spiral gears in power transmitting relation with said shaft.

14. In a rotational viscosimeter including a frame and having inner and outer cylinders adapted to be supported by said frame for relative concentric rotation and means for rotating said outer cylinder relative to said frame, said outer cylinder being adapted to contain material under test, the combination of a shell having an internal bore adapted to receive said outer cylinder in rotatable relation and to serve as a bearing for said outer cylinder, means rigidly connecting said shell to said frame to maintain alignment of said outer cylinder relative to the rotational axis thereof, a shaft connected with said inner cylinder, means supporting said shaft on said frame for rotation about an axis in accurate alignment with the rotational axis of said outer cylinder, electrical means including a member sensitive to strain and means for indicating strain on said sensitive member, means mounting said electrical means with said sensitive member adjacent said shaft, and a member carried by said shaft and positioned to engage said sensitive member upon rotation of said shaft to actuate said electrical means.

ROLF BUCHDAHL.
JOSEPH G. CURADO.

REFERENCES CITED

The following references are of record in the file of this patent:

UNITED STATES PATENTS

| Number | Name | Date |
|---|---|---|
| 2,365,339 | Green | Dec. 19, 1944 |
| 2,410,385 | Loukomsky et al. | Oct. 29, 1946 |